United States Patent [19]

Pekelny

[11] Patent Number: 4,964,758
[45] Date of Patent: Oct. 23, 1990

[54] FLOATING OIL ENCLOSURE BARRIERS AN DISPENSING MEANS ABOARD AN OIL TANKER FOR DISCHARGING WITHOUT THE AID OF SURFACE VESSELS

[76] Inventor: Anatol Pekelny, 17649 Tuscan Dr., Granada Hills, Calif. 91344

[21] Appl. No.: 422,579

[22] Filed: Oct. 17, 1989

[51] Int. Cl.$^5$ .............................................. E02B 15/04
[52] U.S. Cl. ...................................... 405/66; 405/68; 210/242.3; 210/923
[58] Field of Search ...................... 405/60, 63, 64, 66, 405/68, 69, 72; 210/242.3, 776, 923; 114/227, 229

[56] References Cited

U.S. PATENT DOCUMENTS

| | | |
|---|---|---|
| 3,221,884 | 12/1965 | Muller . |
| 3,539,013 | 11/1970 | Smith . |
| 3,641,771 | 2/1972 | Spandau . |
| 3,708,982 | 1/1973 | Blockwick . |
| 3,839,870 | 10/1974 | Ryan ........................................ 405/64 |
| 3,983,034 | 9/1976 | Wilson ........................... 210/242.3 X |
| 4,123,911 | 11/1978 | Finigan et al. . |
| 4,140,424 | 2/1979 | Bretherick et al. .................... 405/68 |
| 4,480,800 | 11/1974 | Oberg et al. ....................... 405/68 X |

FOREIGN PATENT DOCUMENTS 2728835  1/1979  Fed. Rep. of Germany ........ 405/63

Primary Examiner—Randolph A. Reese
Assistant Examiner—John Ricci
Attorney, Agent, or Firm—Laurence R. Brown

[57] ABSTRACT

In order to confine oil spills from a tanker quickly to prevent spreading out over the surface of water as an environmental hazard, enough barrier material is stored on the tanker for discharge to form a floating enclosure for confining the oil, and mechanical aids are provided for quick employment of the barrier material to form the floating enclosure from the deck of the tanker without the help of surface craft. Thus, for example, a stored barrier material such as one or more lengths of hollow plastic tubing may be reeled up until deployed by unreeling and casting overboard to form an enclosure. The tubing may be inflated by pumps located aboard the tanker to float properly in a position above and below the water surface.

15 Claims, 3 Drawing Sheets

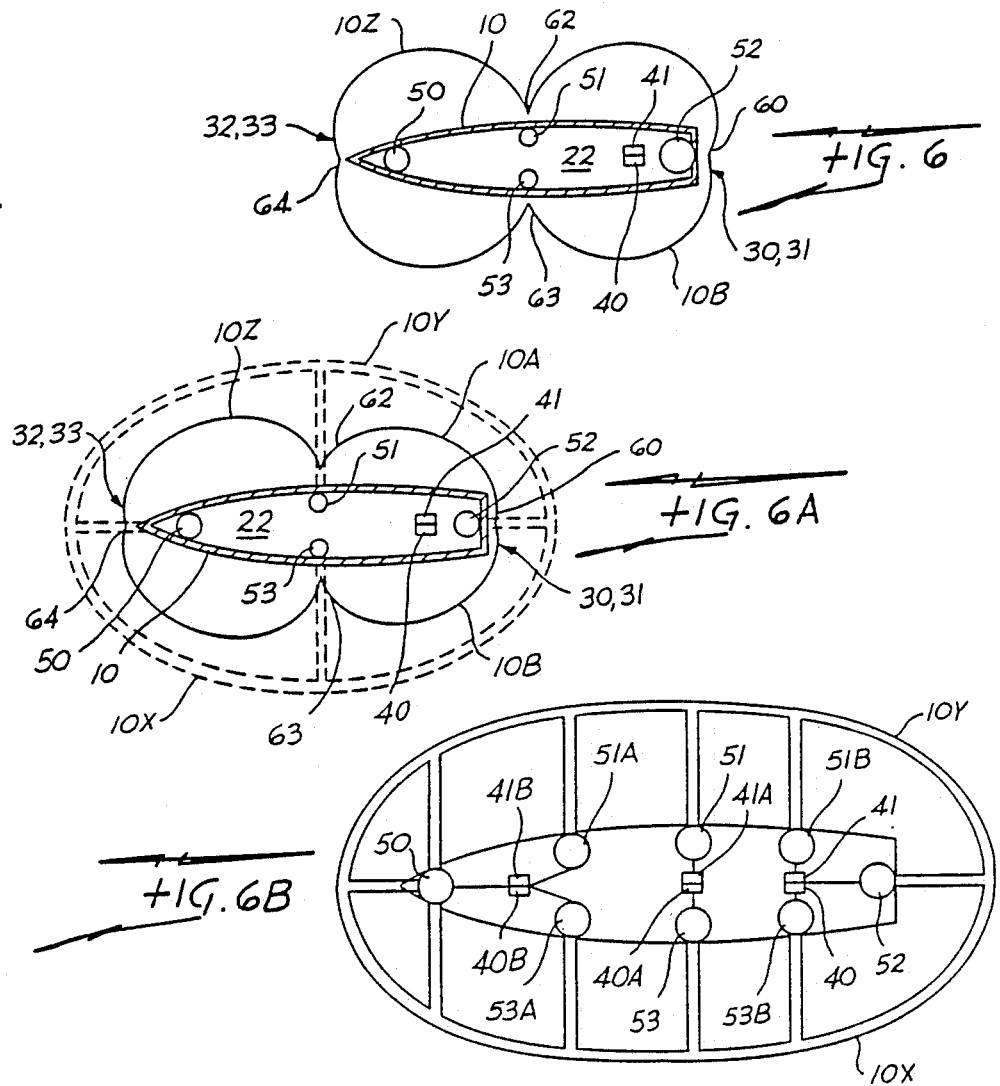
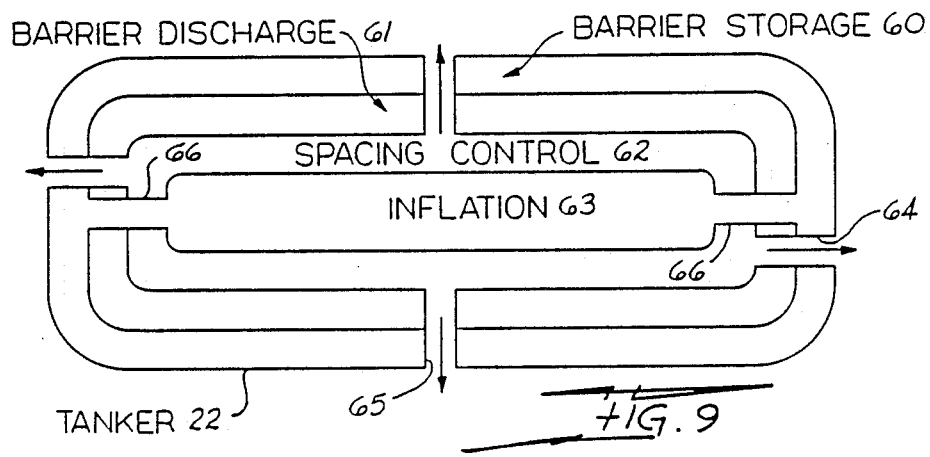

FLOATING OIL ENCLOSURE BARRIERS AN DISPENSING MEANS ABOARD AN OIL TANKER FOR DISCHARGING WITHOUT THE AID OF SURFACE VESSELS

TECHNICAL FIELD

This invention generally relates to control of oil spills from tankers and more specifically relates to the employment of floating barriers to enclose oil spilled on the surface of water.

BACKGROUND ART

Inflatable floating oil barriers for controlling oil on the surface of the water are known in the art. Thus, L. Brotherick, et al., U.S. Pat. No. 4,140,424,, Feb. 20, 1979 provides two hollow plastic tubings which can be inflated respectively with air and water to extend below and above the water surface to confine oil. This, or equivalent type barrier materials can be used in a single length to encircle an oil spill by means of surface craft as set forth in U.S. Pat. No. 4,123,911, A. Finigan, et al., Nov. 7, 1978 example, or a series of lengths can be coupled together as set forth in U.S. Pat. Nos. 3,641,771, H. spandau, Feb. 15, 1972, 3,708,982, Blockwick, Jan. 9, 1973 or 3,539,013, Smith, Nov. 10, 1970.

However these prior art systems and methods of confining oil spills are not really well adapted to protection of the environment, since the time between the detection of a leak of oil from a tanker and the dispersal of the oil over a large area of water is very short, and the time it takes to assemble surface craft and barrier materials for confinement can be very long.

Accordingly this invention has as its general objective better systems and methods of oil control of tanker leaks that prevent extensive environment damage.

Oher objects, features and advantages of the invention will be found throughout the following description, drawings and claims.

DISCLOSURE OF THE INVENTION

This invention accordingly provides a self-contained oil tanker system for deployment of a floating oil confining enclosure that does not require the use of auxiliary surface craft, and which can be quickly put into use when an oil leak is discovered to form a floating barrier enclosure about the tanker in which the leaking oil is confined.

Thus, barrier forming material such as one or more lengths of barrier material, preferably flat, folded or reeled hollow plastic tubing, is arranged aboard the tanker, preferably about the rim of the deck, in a manner permitting quick deployment about the tanker to form the barrier enclosure. Mechanical aids, such as extending arms, catapults, dispensing reels, water and air pumps may be included as part of the tanker system for quiclky deploying the barrier material into a floating enclosure surrounding the tanker to confine oil on the surface of the water. However in a preferred embodiment a set of simultaneously operated reels located about a tanker rim serve to reel out an appropriate length of the barrier material on the water surface to surround the tanker and encompass oil leaking from the tanker. Thus, the minimal staff of the tanker crew can quickly with aid of such a tanker system form the enclosure.

BRIEF DESCRIPTION OF THE DRAWINGS

Similar reference characters designate similar features to facilitate comparison throughout the drawings, wherein:

FIGS. 6, 6A, 6B and 7 are respective alternatie embodiment schematic sketches of preferred simplified tanker systems for storage of barrier materials and deployment to control an oil spill in accordance with this invention, FIG. 9 is a block diagram of an interacting oil control system operable for self deployment of a barrier enclosure for containment of surface oil from an oil tanker without the aid of other surface craft, as afforded by this invention.

THE PREFERRED EMBODIMENT

Figure 1:
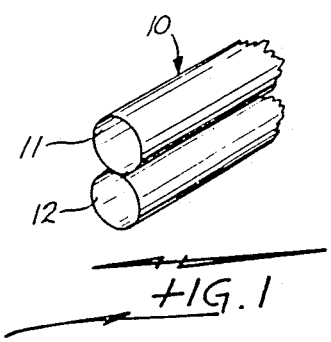
FIG. 1 is a sketch of a portion of a floatable barrier tubing incorporated in a preferred embodiment of the invention.

As seen in FIG. 1, the barrier material 10 preferred for this invention comprises a hollow plastic tubing with two side by side tubes 11, 12 for respective inflation with water and air thereby to form a floating barrier extending below and above water for confining an oil slick on the surface of the water. This barrier material is ideal for storage in minimal space uninflated and flat on one or more reels (21, FIG. 3) on board the tanker 22 or otherwise folded for dispersal in the manner of a parachute for example.

Figure 2:
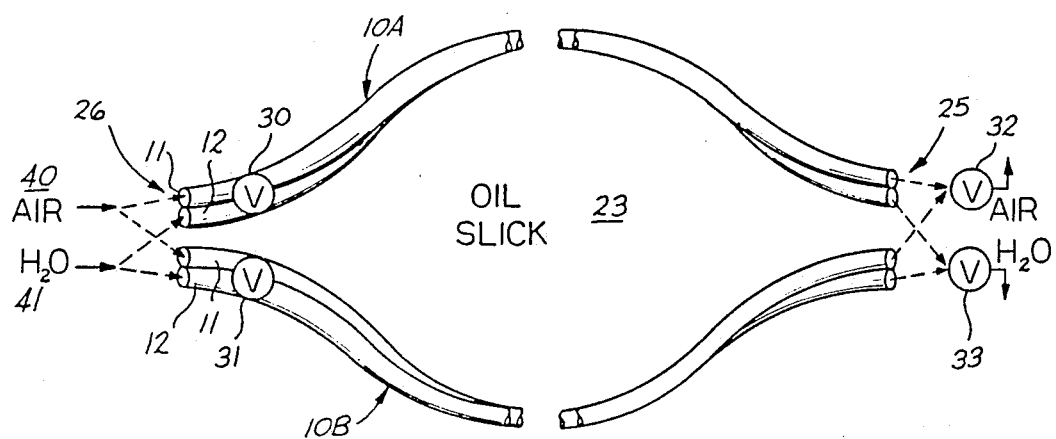
FIG. 2 is a sketch illustrating the inflation and deployment of barrier tubing sections provided in accordance with this invention.

In FIG. 2 is illustrated such barrier material dispersed on the surface of water about an oil slick 23. The barrier material may be dispersed in sections, such as the illustrated two 10A and 10B or in a single length surrounding the slick 23.

If sections are used, they may be connected together as an encompassing unit at 25 and 26 for confinement of the oil slick 23. The pressure release valves 32 and 33 serve the function of permitting the respective side by side tubings 11 and 12 to be inflated with water and air pumps 40, 41 to an optimal pressure limited by the release valves 32, 33 at the other end of respective sections 10A, 10B connected to the pumps for inflation more than one pump set may be used and a single section pumped from one end such as 26, as variations.

Figure 3:
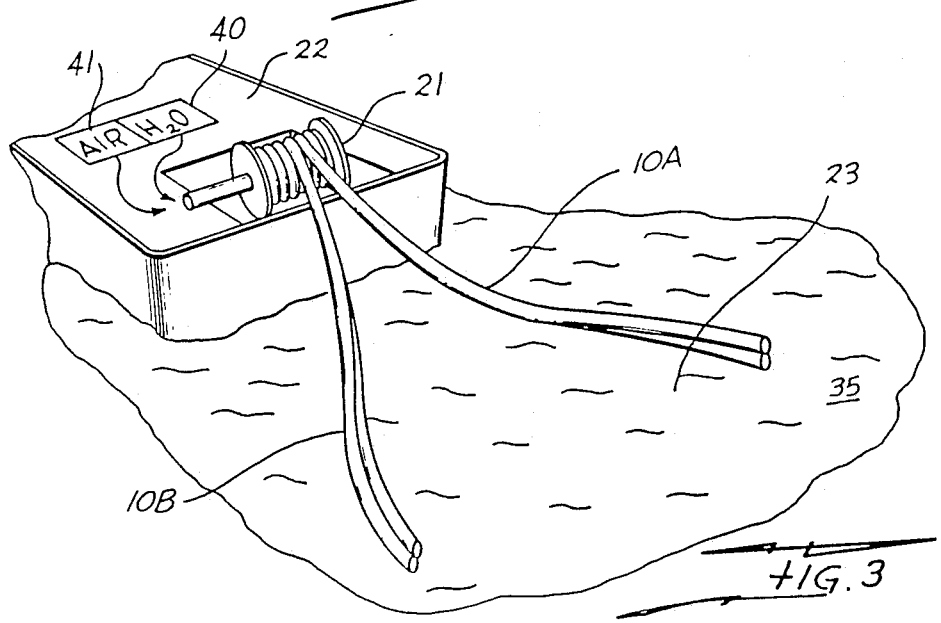
FIG. 3 is a sketch illustrating one embodiment for storing uninflated barrier tubing on a tanker, dispensing it to form an enclosure and inflating it to give it barrier characteristics.

The water pumps 40, 41 are preferably located on the tanker 22 (FIG. 3). The valves 30, 31 at one end of each section are one way flow valves to retain the tubing inflated. The other ends (25) of the sections are connected together in a suitable barrier junction for confining oil.

Figure 4:
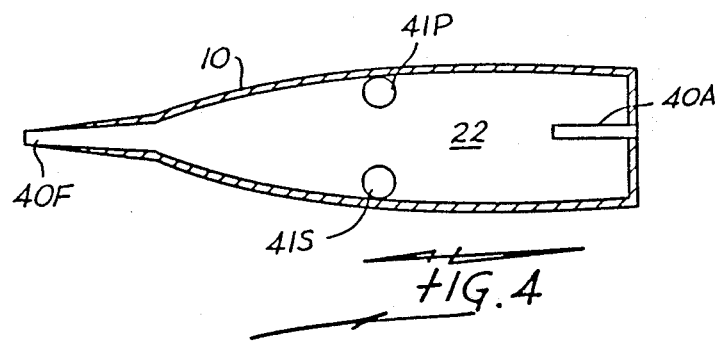
FIGS. 4 and 5 are respective undeployed and deployed sketches of a tanker embodiment providing for storage of barrier material around the rim of the tanker deck where mechanisms aid the deployment of the stored material into an encompassing ring about the tanker.
Figure 5:
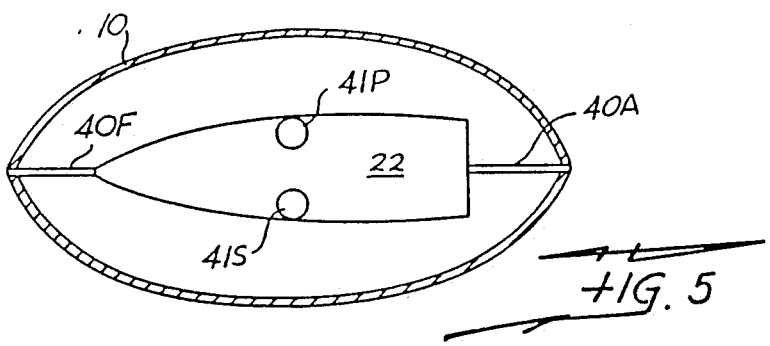

Further functioning of a tanker oil slick control system are illustrated by the embodiment of FIGS. 4 and 5.

The barrier material 10 is hatched for indentification, about the rim of the deck in FIG. 4 when stored, and in a position extended away from the tanker 22 in the deployed position of FIG. 5.

Mechanical aids for deployment of the barrier material are desirable and necessary for two reasons at least. There is a limited number of crew on a tanker for manual deployment, particularly for such quick deployment that even initial portions of an oil spill can be contained. Furthermore, it might be desirable to encompass the tanker with an enclosure extending far enough away from the tanker hull that it would be difficult to manually deploy the barrier material. Thus, two deployment aids are schematically shown, namely extendable fore and aft arms or booms 40F, 40A and catapults 41P and 41S on the port and starboard sides of the tanker.

The extendable arms 40 may be pivoted or telescoped, and are preferably at the ends tethered to the deployed barrier tubing 10 on the water to retain it in a position away from the hulls of the tanker. The tubing may be configured to retain an oval shape away from the tanker side hulls when deployed and inflated, such as by tempering or gathering the inner side of the deployed plasting barrier tubing so that when inflated, the inflation forces define a preferred configuration. Other barrier configurations may employ mechanical means to retain the barrier in an encompassing configuration about the tanker as schematically represented in FIG. 5.

In the preferred embodiment of FIG. 6, the encompassing barrier 10Z is stored on the four reels 50, 51, 52, 53. Pumps 40, 41 are connected to inflate the entire tubing with pressure release valves 32, 33 typically at a remote position. The one way valves 30, 31 are typically located at the pumping junction 60, representing the end of the dual sections 10A, 10B as reeled off reel 52 (See FIG. 3) which after inflation from pumps 40, 41 is thrown overboard into the water.

Other junctions 62, 63, 64 are simply the last portion of the tubing to be unreeled from pumps 51, 53 and 50, which are thrown overboard.

Preferably all reels have motors connected together for operation together for simultaneous unwinding of the barrier enclosure 10Z rapidly and permitting it to fall into the water surrounding tanker 22. In storage condition the barrier material 10X resides around the rim of the tanker and is positioned by weights or the like over the edge of the hull to easily fall overboard when reel tension is relieved.

FIG. 6A shows a preferable configuration with the barrier partially inflated 10A, 10B, 10Z (solid line) and fully inflated -10X, 10Y (broken line).

FIG. 6B shows another implementation of the preferable configuration.

When the length of the tanker is coniderable at first deployment of the barrier is needed, multiple reels (50–55) and additional number of pumps (40–41A, B) are possible.

This embodiment provides a simple low-cost, easy-to-install system for control of oil leaks from tankers.

Figure 7:
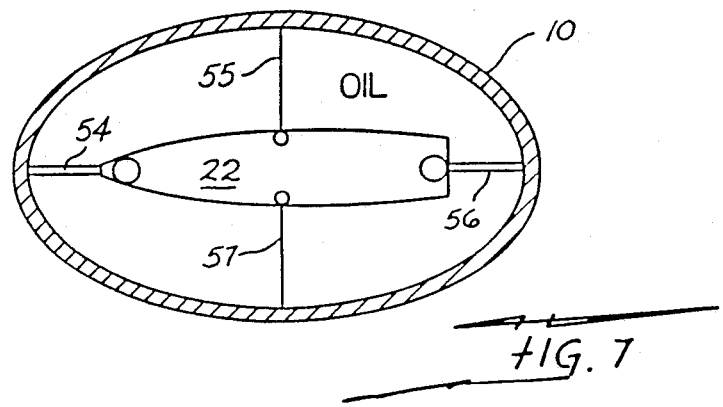

As illustrated by FIG. 7, reels 50 to 53 may contain lines 54 to 56 to be dispensed and tethered to the barrier ring 10 for placement and retrieval purposes.

Figure 8:
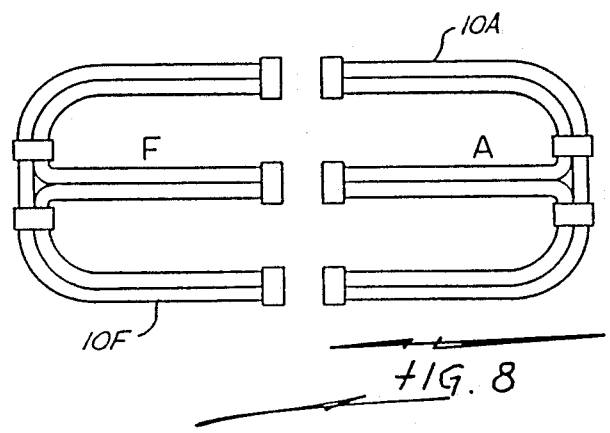
FIG. 8 is a configuration sketch of one embodiment of the barrier afforded by this invention.

In FIG. 8 is shown a configured embodiment of the barrier material having fore F and aft A sections for retention in place by the extension arms 40F and 40A for example. Since the encompassing barrier is for the special purpose of confining oil leaking from the tanker 22, it need not enclose an extensive area since the oil leaks from the hull and immediately surfaces. Furthermore small enclosure areas are preferred for recovery operations that skim off the surface oil. The surface floating capacity of the encompassed area can be engineered to contain all the oil that may be lost from a punctured tank or compartment of the tanker. The area of course need be larger if the tanker is a super tanker with a single tank compartment subject to leakage.

The oil spill control system and method of this invention self contained on a tanker for immediate deployment when an oil leak is encountered is illustrated in the block configuration of FIG. 9. Since individual elements may take many different optional configurations and the present state of the art such as hereinafter set forth provides known elements that may be used in the system, this block diagram constitutes a proper disclosure to those skilled in the art for constructing and practicing the invention.

The outer hulls of the tanker 22 are represented to show that all the elements are self contained aboard the tanker 22 and this system is operable without the aid of other surface vessels to deploy and configure the barrier material into a surrounding enclosure as hereinbefore described.

The barrier storage region 60 comprises compartments or deck space for storage of the barrier material in a manner that it is ready for immediate deployment. Thus it may simply be distributed about the rim of the tanker's deck, or may be folded parachute style in compartments about the deck.

Barrier discharge means, before illustrated as booms and catapults, are associated with the barrier material and barrier storage means 60 so that the barrier material may be discharged from the tanker into the water in a configuration enveloping and spaced from the tanker. Several catapults about the tanker rim may be example discharge a weight attached to the barrier material to carry it outward by means of an explosive discharge. It is desirable that the system synchronize and control the system of discharge devices for simultaneous and concerted operation on at least any séparable sections of the barrier material to be deployed.

After or concurrent with deployment of the barrier material, spacing control means 62 is employed to maintain the enclosure in place spaced away from the tankers hull an appropriate distance, such as for example by means of the hereinbefore described telescopic fore and aft booms. This system feature may also be employed with the inflation means 63 as before described by tubing configuration that assumes a preferred configuration after inflation. The passageways 65 with arrows 64 schematically represent some means for employing forces away from the hull to keep the enclosure barrier in a position spaced away from the hull far enough to encompass any oil leaking from the hull.

The inflation means 63 is only necessary when the preferred inflatable tube barrier material embodiment of the invention is used, and stored in uninflated condition aboard the tanker before deployment. Obvious advantages of light weight, small storage space, etc. are afforded by this embodiment. The passages 66 schematically illustrate a connection between inflation pumps and the barrier materials when the inflation takes place. Alternative means to pumps may be employed such as release of compressed air from deployment controlled cartridges or the like for the air tubing control. Also barrier materials are known that absorb water to take a heavier than water underwater wall like configuration as alternatives to the water inflated tubing, which would constitute equivalencies to the inflation pumping means hereinbefore described. Also foam or other floating materials may be employed without the necessity for pump inflation means.

It should therefore be evident that this invention has improved the state of the art by providing means and method of control of oil leaks from a tanker by means of an in-situ system on the tanker, so that immediate control can be undertaken when a leak is discovered without marshalling outside resources and surface craft. Accordingly those features of novelty believed to define the spirit and nature of the invention are set forth with particularity in the appended claims.

I claim:

1. The method of controlling oil spills comprising the steps of:
    storing in an accessible position about an oil carrying tanker an elongatable, floatable oil encompassing barrier capable of containing oil on the surface of water and having a length great enough to surround the tanker and form an enclosure floating on the water at a predetermined distance away from the tanker,
    providing means on the tanker for aid in discharging the barrier from the tanker into the water and forming it into said enclosure configuration,
    discharging the barrier to control oil discharged from the tanker by catapulting the barrier from the tanker, and
    forming a floating oil containing enclosure about the tanker with said barrier.

2. The method of claim 1 further including the step of confining the shape of the enclosure about the tanker by connection lines between the tanker and the barrier.

3. The method of claim 1 wherein the step of forming a floating enclosure further comprises the steps of: providing an inflatable hollow tube type of barrier material, and inflating the hollow tube to float by pumping air thereinto from pumps located aboard the tanker.

4. The method of claim 1 further comprising the steps of: providing in a stored position aboard the tanker extendable arms for positioning the barrier material at a predetermined position away for the tanker.

5. The method of claim 1 wherein said step for forming the enclosure further comprises the step of forming said enclosure from the tanker without deployment of surface craft.

6. The method of claim 1 wherein the storing step further comprises the arrangement of the barrier material in a folded manner about an outer rim of a deck on the tanker.

7. The method of claim 1 wherein the storing step further comprises the winding of the barrier material on reels located in a plurality of positions about an outer rim of a deck on the tanker.

8. The method of claim 1 wherein the step of providing means to aid in the discharge of the barrier material further comprises the steps of providing stations at bow and stern positions on the tanker, and locating at such stations means for dispensing a length of said barrier material into the water.

9. The method defined in claim 8 wherein the step of providing means to aid in the discharge of the barrier material further comprises providing two additional stations on opposite sides of the tanker for dispensing lengths of said barrier material.

10. The method defined in claim 8 further comprising the step of controlling spacing of the barrier material away from the tanker by inflation of tubing to assume a configuration maintaining the barrier material spaced away from the tankers hull.

11. The method defined in claim 1 further comprising the steps of forming the barrier from a plurality of sections each retained in place at corresponding positions on the tanker.

12. The method of controlling oil spills comprising the steps of:
    storing in an accessible position about an oil carrying tanker an elongatable, floatable oil encompassing barrier capable of containing oil on the surface of water and having a length great enough to surround the tanker and form an enclosure floating on the water at a predetermined distance away from the tanker,
    providing means on the tanker for aid in discharging the barrier from the tanker into the water and forming it into said enclosure configuration,
    discharging the barrier to control oil discharged from the tanker by catapulting the barrier from the tanker,
    forming a floating oil containing enclosure about the tanker with said barrier, and
    forming with said barrier material at least two semi-enclosure configurations to be discharged in said discharging step from different positions on the tanker, and joining the configurations together in said step for forming an enclosure.

13. An oil tanker comprising in combination, a stored quantity of barrier material aboard the tanker capable of forming a floating enclosure about the tanker that retains oil discharged from the tanker, and mechanical discharge catapulting means resident on the tanker for aiding the dispensing of the barrier material from the tanker to form said floating enclosure.

14. An oil tanker comprising in combination, a stored quantity of barrier material aboard the tanker capable of forming a floating enclosure about the tanker that retains oil discharged from the tanker, and mechanical discharge means resident on the tanker for aiding the dispensing of the barrier material from the tanker to form said floating enclosure wherein said mechanical discharge means comprises at least two reels containing lines for attachment to the barrier material enclosure to retain the material at a position in the water not exceeding a predetermined distance away from a hull wall of the tanker when the lines are dispensed from the reels.

15. The tanker of claim 14, wherein the barrier material comprises inflatable tubing structure, further comprising inflation means for inflating the barrier tubing to form in conjunction with said lines a preferred configuration after inflation.

* * * * *